United States Patent
Udeinya

(10) Patent No.: US 7,445,732 B2
(45) Date of Patent: Nov. 4, 2008

(54) FIRE RETARDANT COMPOSITIONS AND METHODS FOR THEIR PREPARATION AND USE

(76) Inventor: Iroka J. Udeinya, 66 Daniel Pl., Fanwood, NJ (US) 07023

( * ) Notice: Subject to any disclaimer, the term of this patent is extended or adjusted under 35 U.S.C. 154(b) by 82 days.

(21) Appl. No.: 11/464,316

(22) Filed: Aug. 14, 2006

(65) Prior Publication Data

US 2008/0035899 A1  Feb. 14, 2008

(51) Int. Cl.
C09K 21/00 (2006.01)
C09K 21/02 (2006.01)
C09K 21/04 (2006.01)
C09D 5/18 (2006.01)
A62C 31/00 (2006.01)
A62C 13/00 (2006.01)
A62D 1/00 (2006.01)

(52) U.S. Cl. ............... 252/607; 252/608; 252/609; 252/610; 252/611; 252/2; 252/8; 252/8.05; 169/30; 169/45; 169/46; 169/47; 106/18.14; 106/18.15; 106/18.16

(58) Field of Classification Search ............... 252/607
See application file for complete search history.

(56) References Cited

U.S. PATENT DOCUMENTS

| 1,685,534 | A | * | 9/1928 | Drahn | 422/106 |
| 2,442,707 | A | | 6/1948 | Olson | |
| 3,833,628 | A | * | 9/1974 | Pike et al. | 554/11 |
| 6,610,770 | B1 | | 8/2003 | Ross et al. | |
| 2006/0211875 | A1 | * | 9/2006 | Tischenborf | 554/174 |

FOREIGN PATENT DOCUMENTS

JP  411021764 A  *  1/1999

OTHER PUBLICATIONS

JP English Language Abstract of JP411021764A entitled: "Application of Extract from Burned Ash Of Oil Palm Bark", (Jan. 26, 1999).*
Article entitled: "Favorable Palm Oil Production for Cote d'Ivoire", by the USDA's Production Estimates and Crop Assessment Division Foreign Agricultural Service, Sep. 13, 2002.*

* cited by examiner

Primary Examiner—Joseph D Anthony
(74) Attorney, Agent, or Firm—Darby & Darby

(57) ABSTRACT

Fire retardant compositions containing an extract of African Oil Palm fruit, methods of preparing such compositions, and their use in imparting fire resistance to objects are disclosed.

16 Claims, No Drawings

FIRE RETARDANT COMPOSITIONS AND METHODS FOR THEIR PREPARATION AND USE

FIELD OF THE INVENTION

This invention relates to fire retardant compositions comprising an extract of African Oil Palm fruit, methods of preparing such compositions, and their use in imparting fire resistance to objects.

BACKGROUND OF THE INVENTION

Fires each year result in great loss of life and property with an estimated annual cost to society of over $100 billion. (Gann R., Flame Retardants (Overview), *Kirk-Othmer Encyclopedia of Chemical Terminology*. Vol. 10. 4th ed. 1993: 930.) Fire retardants are chemicals that can be applied to a combustible object to reduce flammability or retard the spread of fire over its surface. They are commonly applied to textiles and building materials where fire resistance is particularly desirable. Many fire retardants are synthetic phosphorus-containing compounds. However questions concerning the health and safety of some of these chemicals have caused several principal suppliers to scale back their operations or completely exit the fire retardant market. (Calamari et al., Flame Retardants for Textiles, *Kirk-Othmer Encyclopedia of Chemical Terminology*. Vol. 10. 4th ed. 1993:1016.) Therefore, there remains a need for improved non-toxic fire retardant compositions that can be applied to textiles, building materials, and other objects and materials where fire resistance is desirable.

The African Oil Palm (*elaeis guineensis*) is a member of the palm family native to west Africa. It produces the world's largest fruit crop, having bundles of fruit weighing in excess of 40 kg. The fruit is used commercially for the production of palm oil. However, the fruit has not previously been known to provide an extract having fire retardant characteristics. It has been surprisingly discovered that an extract derived from the fruit of the African Oil Palm imparts exceptional fire resistance to materials treated with compositions containing the extract.

SUMMARY OF THE INVENTION

In one aspect, this invention provides fire retardant compositions comprising an extract of African Oil Palm (*elaeis guineensis*) fruit.

In another aspect, this invention provides a method of preparing a fire retardant composition comprising:

a) burning fruit of the African Oil Palm (*elaeis guineensis*) to obtain a burned residue;

b) adding the burned residue to a first solvent to obtain a first liquor;

c) separating the first liquor to remove insoluble matter and obtain a filtrate;

d) drying the filtrate to obtain an extract; and e) adding the extract to a diluent to obtain a fire retardant composition.

In yet another aspect, this invention provides a method for imparting fire resistance to an object by applying a fire retardant composition comprising an extract of African Oil Palm fruit.

This invention also provides fire-resistant materials and fire extinguishers comprising an extract of African Oil Palm fruit.

DETAILED DESCRIPTION OF THE INVENTION

The invention provides fire retardant compositions comprising an extract of African Oil Palm (*elaeis guineensis*) fruit. The compositions may be in any form that allows for effective application, such as liquids, gels, pastes, and foams. The fire retardant compositions may be applied by methods known to those skilled in the art.

In one embodiment, the extract in the fire retardant composition comprises from about 0.2 to about 0.8 mole percent of phosphate, from about 10.0 to about 32.0 mole percent of potassium, from about 0.04 to about 0.09 mole percent of nitrogen, from about 0.3 to about 0.5 mole percent of calcium, from about 0.19 to about 0.49 mole percent of chloride, and up to about 0.06 mole percent of magnesium, based upon 100 mole percent of the extract.

The invention also provides a method of preparing fire retardant compositions from the fruit of the African Oil Palm. The fruit is carbonized by burning. The burned material is added to a first solvent to obtain a first liquor. Preferably, the burned material is allowed to soak in the first solvent for at least 24 hours. Insoluble matter is removed from the first liquor to obtain a filtrate. The filtrate is dried to yield the desired extract. The extract is added to a diluent to obtain a fire retardant composition.

In applications where the fire retardant composition is used in liquid form, the crystallized extract may be dissolved in a suitable solvent, preferably clean, acid-free water. The amount of the extract dissolved in the solvent can vary according to the desired application. For applications in the treatment of wood, paper, foam, and textiles, as well as in the constitution of fire extinguishers containing the fire retardant composition, it is preferred that the extract is dissolved in the solvent to a final concentration of about 50 to about 250 grams per liter.

In one preferred embodiment, the filtrate is dried and washed with a second solvent, from which the extract is crystallized. Preferably, the filtrate is allowed to soak in the second solvent for at least 24 hours. The extract may be crystallized, for example, by heating and cooling, evaporation, drowning, or chemical reaction. Heating and cooling is a preferred method of crystallization.

According to another preferred embodiment, the first and/or second solvents containing the dissolved extract are separated from insoluble matter by centrifugation.

Preferred first and second solvents according to the present invention are water.

This invention also provides a method for imparting fire resistance to an object by applying a fire retardant compositions comprising an extract of African Oil Palm (*elaeis guineensis*) fruit. The fire retardant composition may be applied, for example, by soaking, dipping, spraying, cascading, or brushing. The preferred mode of application will be apparent to one skilled in the art based on the characteristics of the object to be treated.

Preferred objects include textiles such as those made from cotton, linen, hemp, and other natural plant fibers; wool and other animal fibers; and synthetic fibers such as acrylic, nylon, and polyester. The textile may constitute all or part of the object to be treated. The textile may be treated during production of the object or after the object is placed in use, such as by a consumer.

Examples of textiles contemplated by the present invention include, but are not limited to, residential and commercial furnishings such as upholstered furniture and panels, draperies, rugs, and carpeting; linens such as bedding and pillows; mattresses and futons; and fire resistant blankets and clothing for use in emergencies.

Other preferred objects include construction materials for use in, for example, home, commercial, industrial, automotive, aeronautic, and marine applications. These include materials containing wood, wood fiber composites, wood veneer, grass thatch, bamboo, paper, open or closed cell foam, and natural or synthetic fibers. The types of materials include lumber, flooring, wallboard, roofing shingles, siding, insulation, and paper-backed construction products.

Preferred objects also include fire barrier materials to protect property and control the spread of wildfires. The fire barrier material may be composed of any material capable of absorbing or retaining the fire retardant composition. The fire retardant composition may be applied before or after the fire barrier material has been placed in its protective location.

Preferred objects also include paper materials for which fire resistance is desired and Christmas trees.

This invention also provides fire-resistant materials and fire extinguishers comprising an extract of African Oil Palm fruit. Examples of such materials include construction products such as adhesives, puttys, caulks, spackling, sealants, and insulating foam; and coatings such as paints, primers, stains, varnishes, sealers, epoxies, or polymers.

The following examples are illustrative of the invention and should not be construed as limiting the scope of the invention as set forth in the claims.

Preparation of an Extract of the African Oil Palm Fruit

EXAMPLE 1

The seeds of African Oil Palm fruit were removed and the fruit was completely burned. The burned residue of the fruit was washed in water and the liquid was collected. Solid matter was separated by centrifuge. The water was evaporated, and the remaining dry material was added to water and allowed to soak for several days. Solid matter was again separated by centrifuge. The extract was crystallized by heating and cooling and air dried.

Characterization of the Extract of the African Oil Palm Fruit

EXAMPLE 2

Characterization of the extract isolated in Example 1 was performed by flame spectroscopy. The analysis provided the following approximate composition:

| Constituent | Mole % |
| --- | --- |
| Phosphates | 0.2 to 0.8 |
| Potassium | 10.0 to 32.0 |
| Nitrogen | 0.04 to 0.09 |
| Calcium | 0.3 to 0.5 |
| Magnesium | 0.0 to 0.06 |
| Chloride | 0.34 |

Preparation of a Fire Retardant Composition

EXAMPLE 3

A fire retardant composition was prepared from the crystalline extract isolated in Example 1 by dissolving the crystals in clean, acid-free water. The concentration of the prepared composition was approximately 100 g/L.

Application of the Fire Retardant Composition to Wood, Paper, Foam and Cotton Materials

EXAMPLE 4

Wood panels (approximately 30 cm×30 cm×2.5 cm) were treated by soaking overnight in the fire retardant composition prepared in Example 3. As a control, wood panels of the same dimensions were soaked overnight in water. The treated and control panels were completely dried and used to construct treated and untreated test "houses," respectively.

The houses were each surrounded with wood shavings, and the shavings were ignited. The fires produced by the shavings engulfed both houses. The wood panels of the untreated house ignited within 5 minutes and continued to burn after the shavings were consumed 20 minutes later. The untreated house was completely destroyed by fire within 30-45 minutes. The exterior surface of the treated house was blackened where contacted by flames and smoke, but the house did not ignite and remained structurally intact.

EXAMPLE 5

Treated and untreated panels of plywood were prepared by the procedure described in Example 4. The panels were subjected continuously to a flame from ignited wood shavings. The control panels easily ignited in less than 10 minutes and burned, while the treated panels resisted ignition and did not burn.

Treated and untreated panels were also prepared by the procedure described in Example 4 and then faced with a veneer. Upon being subjected to a flame, the veneer on the untreated panel ignited and both the veneer and panel were completely burned. The veneer on the treated panel ignited and burned but the panel itself resisted ignition and was not burned.

EXAMPLE 6

Cotton fabric (20 cm×10 cm) was soaked in the fire retardant composition prepared in Example 3 for approximately 30 minutes and dried. Untreated cotton was similarly prepared as a control by soaking in water and drying. The pieces of fabric were hung from a cross bar.

Candle flame was continuously applied to each piece of cloth for more than 10 minutes or until the cloth ignited, whichever occurred first. The untreated piece immediately caught fire and burned completely. The treated piece became wrinkled at the edges and was blackened by the flame but did not ignite.

EXAMPLE 7

Foam rubber was soaked in the fire retardant composition prepared in Example 3 for approximately 5 minutes and dried. Untreated foam rubber was prepared by soaking in water and drying. The treated and untreated foam rubber were sandwiched between pieces of untreated foam rubber to form treated and untreated test samples, respectively.

One untreated end of each sample was ignited. The fire burned completely through the center of the untreated sample and consumed the entire sample. The untreated end of the treated sample was burned, but the fire was stopped by the treated center portion of the sample. The treated center portion was blackened and brittle at the edge in direct contact with the flame but did not ignite. The other untreated end of the sample was protected by the treated center portion.

EXAMPLE 8

Cardboard paper (2 mm thick) was treated by soaking the fire retardant composition prepared in Example 3 for approximately 15 minutes and dried. As a control, cardboard paper of the same construction was prepared by soaking in water and drying. Newsprint was attached to each end of both the treated and untreated sheets of cardboard.

Newsprint on one end of each sheet of cardboard was ignited. The newsprint attached to the untreated cardboard burned and ignited the cardboard. The untreated cardboard and opposite piece of newsprint were consumed by the fire. The newsprint attached to the treated cardboard burned but did not ignite the cardboard. The treated cardboard was charred on its edge but prevented the opposite piece of newsprint from being reached and ignited by the fire.

EXAMPLE 9

Treated and untreated control samples of plywood and cotton fabric were prepared as described in Examples 5 and 6, respectively. Separate samples were then drenched in each of gasoline, kerosene, and diesel fuel and ignited. The untreated samples were completely consumed by fire. The treated samples were blackened by the burning fuel, but did not themselves ignite and retained their structurally integrity.

Fire Extinguisher Containing the Fire Retardant Composition

EXAMPLE 10

Separate pieces of cloth (60 cm×60 cm) were soaked in each of gasoline, kerosene, and diesel fuel and ignited. The fire retardant composition prepared in Example 3 was sprayed on the burning cloth. As a control, water was sprayed on a separate fuel-soaked burning cloth in the same manner. The burning cloth sprayed with the fire retardant composition was extinguished immediately. The extinguished cloth still contained unburned fuel. The control cloth sprayed with water was not successfully extinguished. The cloth burned until the fuel and cloth were completely consumed.

Fire Barrier Material Containing the Fire Retardant Composition

EXAMPLE 11

Wood shavings were soaked in the fire retardant composition prepared in Example 3 and dried. The treated wood shavings were arranged in a ring. Untreated wood shavings were placed in the central area of the ring. The treated wood shaving were surrounded with additional untreated wood shavings. The untreated wood shavings on the outside of the ring were ignited. The fire completely burned the outer perimeter but did not ignite the ring of treated wood shavings. The central area of untreated wood shavings was protected from the fire.

Fire-Resistant Paint Containing the Fire Retardant Composition

EXAMPLE 12

The fire retardant composition prepared in Example 3 was thoroughly mixed into both oil and water-based paints. Pieces of wood were painted with the treated paint, and control pieces were painted with untreated paint. The painted wood pieces were allowed to dry completely. Each of the painted pieces was placed in the flame of a Bunsen burner.

The pieces painted with the untreated paint readily caught fire and burned, while those pieces painted with the treated paint did not ignite or burn.

All references cited herein are incorporated by reference.

I claim:

1. A fire retardant composition comprising an extract of African Oil Palm (*elaesis guineensis*) fruit; wherein said fire retardant composition is prepared by a process comprising:
    a) burning fruit of the African Oil Palm (*elaesis guineensis*) to obtain a burned residue;
    b) adding the burned residue to a first solvent to obtain a first liquor;
    c) separating the first liquor to remove insoluble matter and obtain a filtrate;
    d) drying the filtrate to obtain an extract; and
    e) adding the extract to a diluent to obtain a fire retardant composition.

2. The fire retardant composition of claim 1, wherein the extract comprises:
    from about 0.2 to about 0.8 mole percent of phosphate,
    from about 10.0 to about 32.0 mole percent of potassium,
    from about 0.04 to about 0.09 mole percent of nitrogen,
    from about 0.3 to about 0.5 mole percent of calcium,
    from about 0.19 to about 0.49 mole percent of chloride, and
    up to about 0.06 mole percent of magnesium, based upon 100 mole percent of the extract 3. The fire retardant composition of claim 1, containing from about 50 grams to about 250 grams of the extract per liter of a diluent.

4. A method of preparing a fire retardant composition comprising:
    a) burning fruit of the African Oil Palm (*elaesis guineensis*) to obtain a burned residue;
    b) adding the burned residue to a first solvent to obtain a first liquor;
    c) separating the first liquor to remove insoluble matter and obtain a filtrate;
    d) drying the filtrate to obtain an extract and
    e) adding the extract to a diluent to obtain a fire retardant composition.

5. The method of claim 4, wherein step d) comprises evaporating the first solvent from the first liquor to produce a concentrated bittern;
    adding the concentrated bittern to a second solvent to obtain a second liquor; and
    crystallizing the extract from the second liquor.

6. The method of claim 5, wherein step c) comprises centrifuging the first liquor and step d) further comprises centrifuging the second liquor before crystallizing the extract.

7. The method of claim 4, wherein step b) comprises soaking the burned residue in the first solvent for at least about 24 hours.

8. The method of claim 5, wherein step d) further comprises soaking the concentrated bittern in the second solvent for at least about 24 hours.

9. The method of claim 4, wherein step d) comprises crystallizing by heating and cooling.

10. The method of claim 5, wherein the first and second solvents are water.

11. A method of imparting fire resistance to an object by applying the fire retardant composition of claim 1, to the object.

12. The method of claim 11, wherein the object is selected from the group consisting of textiles, building materials, paper materials, fire barrier materials, insulation materials, and Christmas trees.

13. The object prepared according to the method of claim 11.

14. A fire-resistant coating comprising the fire retardant composition of claim 1.

15. The fire-resistant coating of claim 14, wherein the coating is a paint.

16. A fire extinguisher comprising the fire retardant composition of claim 1.

* * * * *